UNITED STATES PATENT OFFICE.

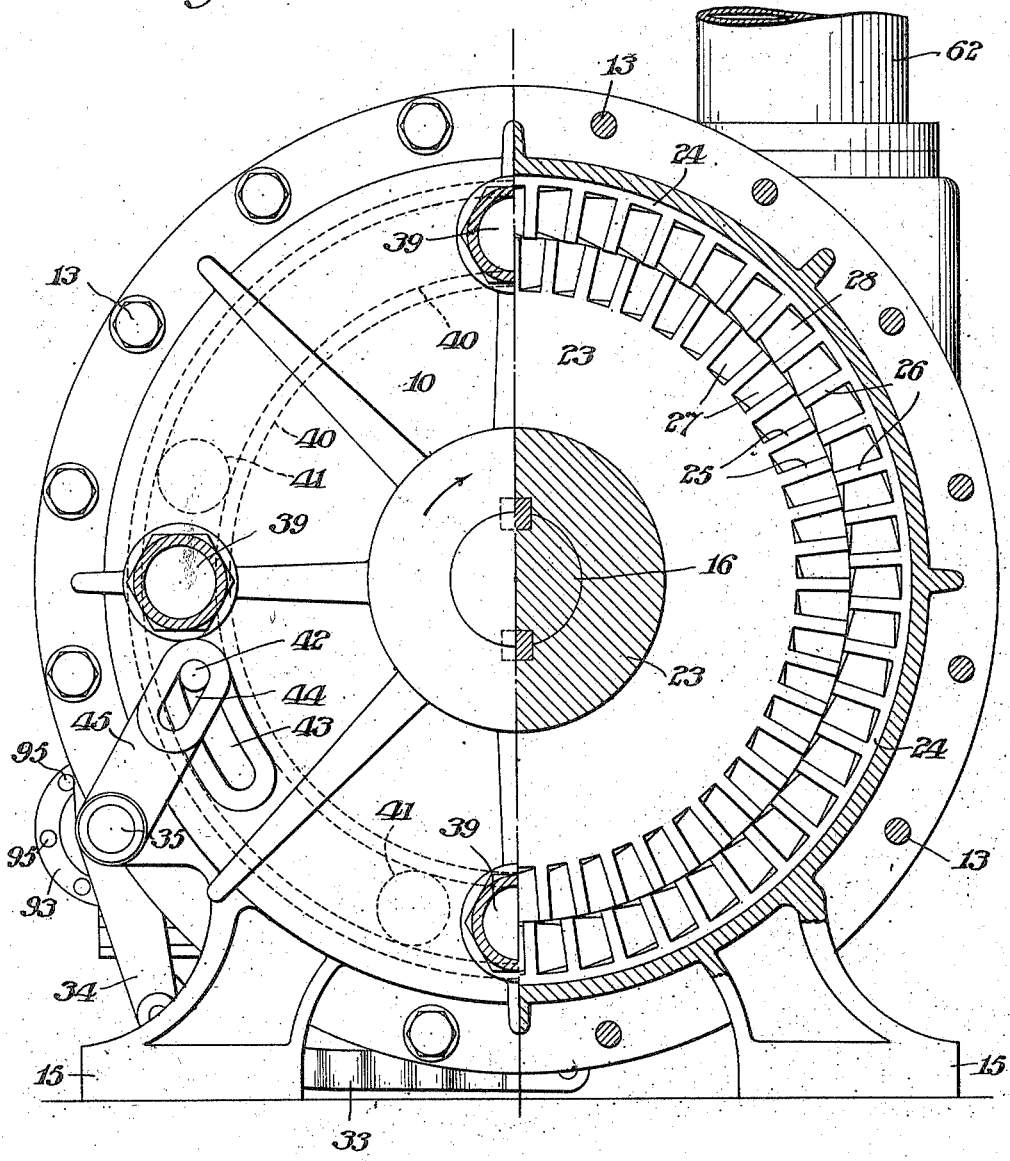

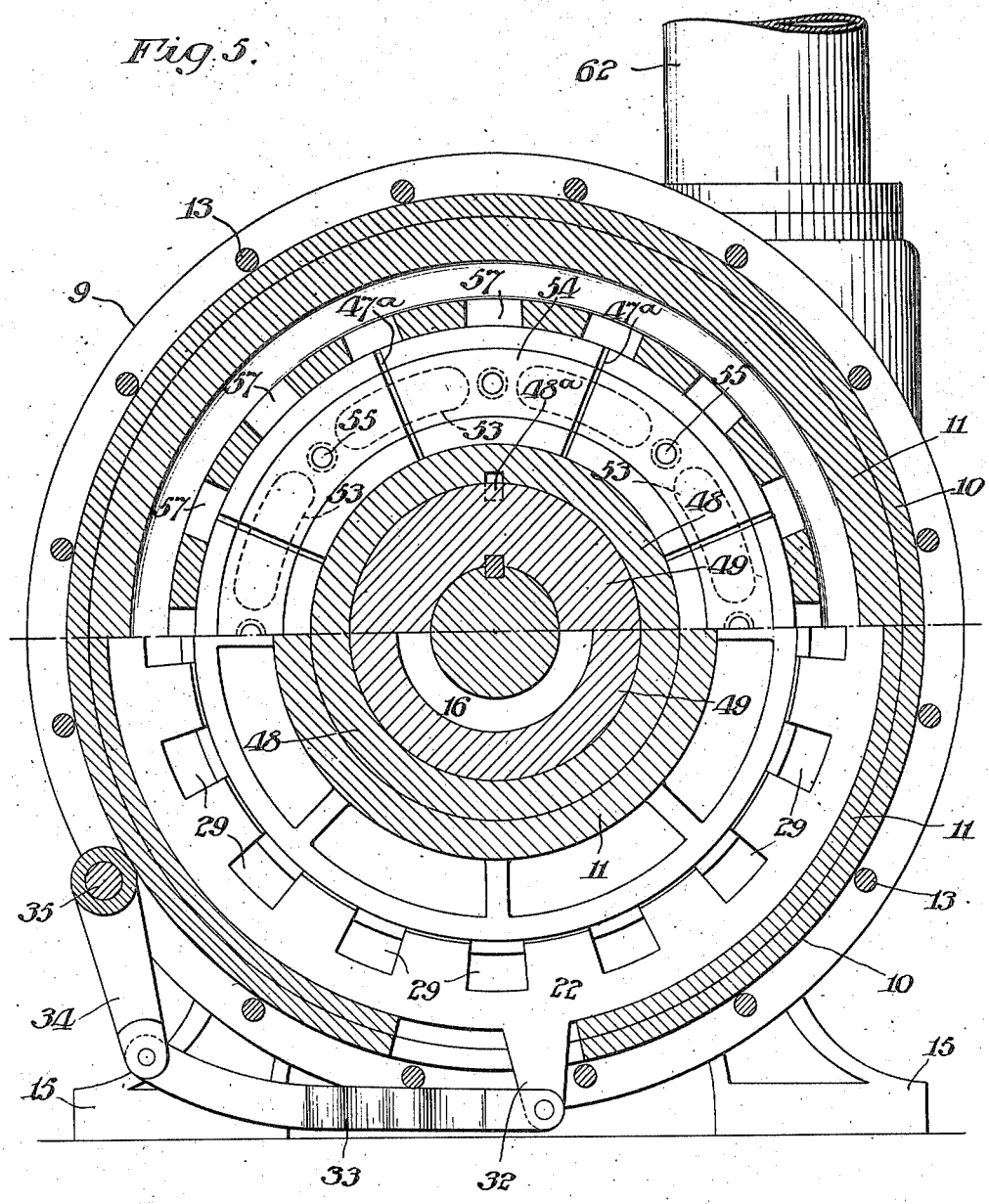
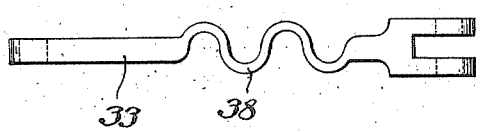

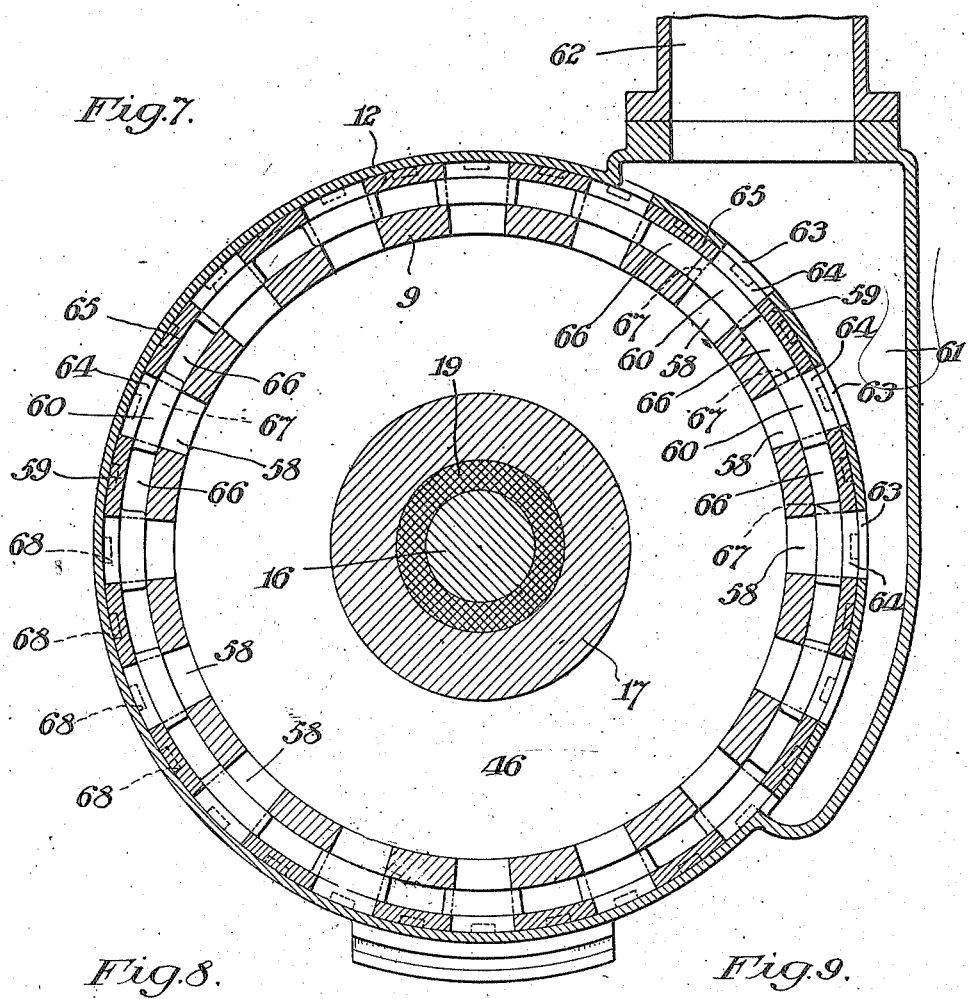
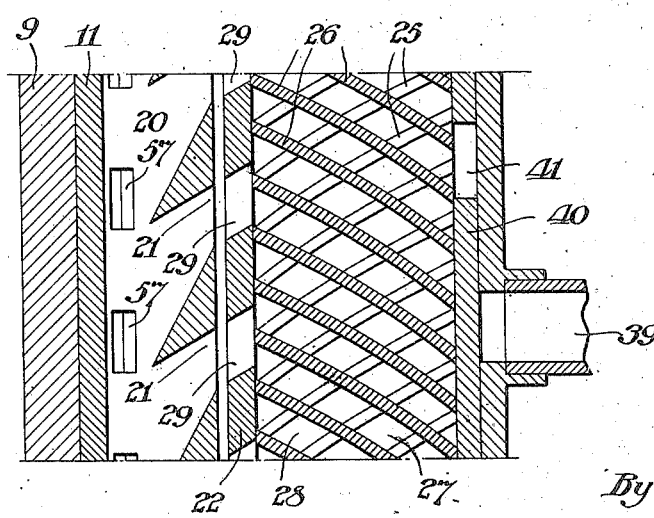
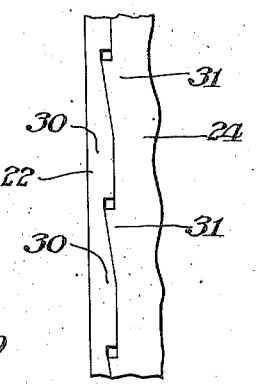

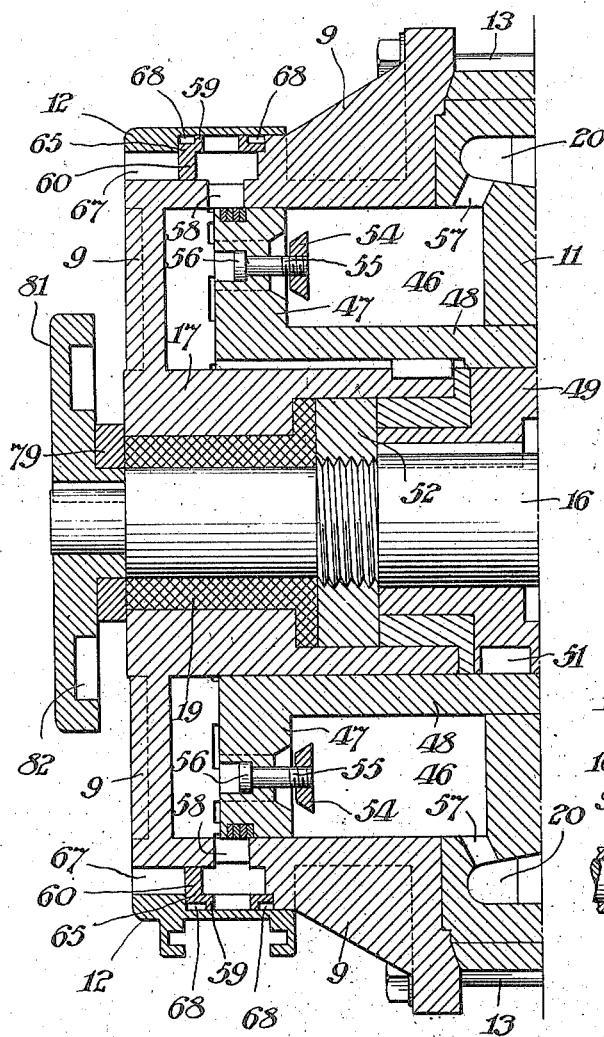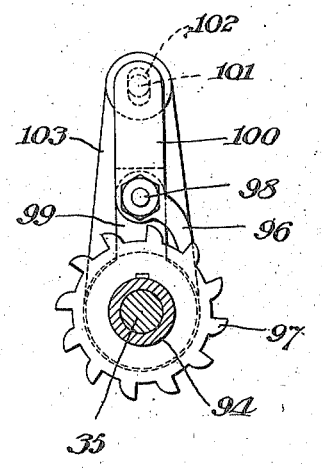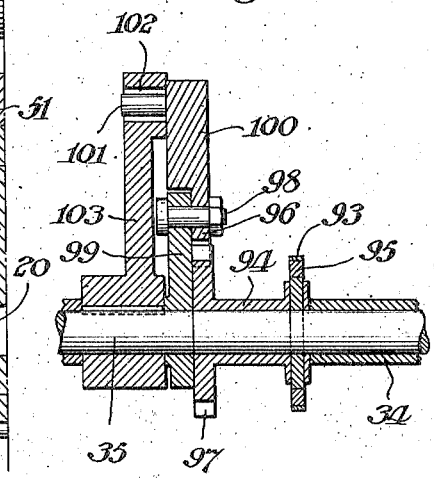

GEORGE P. MALLORY, OF PHILADELPHIA, PENNSYLVANIA, ASSIGNOR OF ONE-HALF TO HERMAN E. MUTH, OF EAST LANSDOWNE, PENNSYLVANIA.

INTERNAL-COMBUSTION ENGINE.

1,315,230.          Specification of Letters Patent.      Patented Sept. 9, 1919.

Application filed July 3, 1917. Serial No. 178,336.

*To all whom it may concern:*

Be it known that I, GEORGE P. MALLORY, a citizen of the United States, residing at Philadelphia, in the county of Philadelphia and State of Pennsylvania, have invented certain new and useful Improvements in Internal-Combustion Engines, of which the following is a specification.

My invention relates to improvements in internal combustion engines, and the objects of my invention are: first, to reduce the weight per horse power; second, to lessen shock and vibration; third, to facilitate cooling by passing an explosive charge and a non-explosive charge through the combustion chamber and other parts of the engine in alternate succession; fourth, to utilize a larger percentage of the available energy by utilizing the expansive qualities of the fired charges down to the lowest limit; and, fifth, to provide an engine of novel, simple and efficient construction in which expanding gases act directly upon impulse members, which are constructed generally on the turbine principle, for the actuation of the power shaft.

With these and related objects in view, my invented engine consists of the elements and the combinations of them hereinafter described and claimed.

In the accompanying drawings, illustrating my invention:

Fig. 4 is a view of the exhaust end of the engine, partly in section.

Fig. 5 is a transverse section through the engine, on line 5—5 of Fig. 1, showing the piston valve and the valve controlling the combustion chamber outlets.

Fig. 6 is a top view of the spring arm for operating the valve for the combustion chamber outlet openings.

Fig. 7 is a transverse section, one line 7—7 of Fig. 1, showing the gas inlet valve.

Fig. 8 is a sectional detail, on line 8—8 of Fig. 1, showing a part of the combustion chamber and impulse members.

Fig. 9 is a detail, in plan, showing a portion of the valve for controlling the outlet openings of the combustion chamber and a portion of the adjacent fixed impulse member.

Fig. 10 is a view of a portion of Fig. 1, showing the position of the piston at the completion of its outward movement.

Figs. 11 and 12 are details, in section, of the operating devices for the electrical contact making and breaking wheel.

Figure 1:
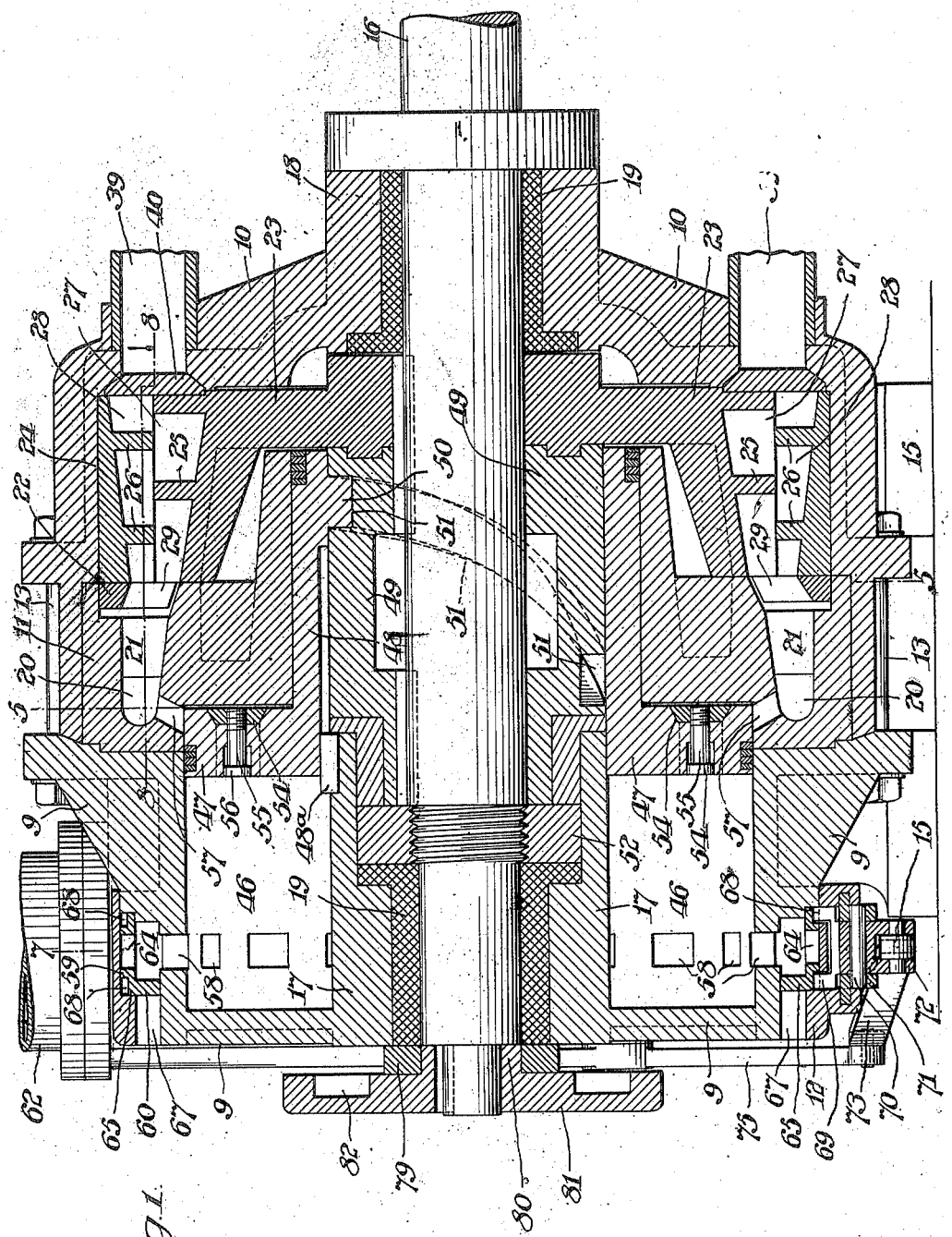
Figure 1 is a longitudinal, vertical section of a gas engine embodying my invention.
Figure 2:
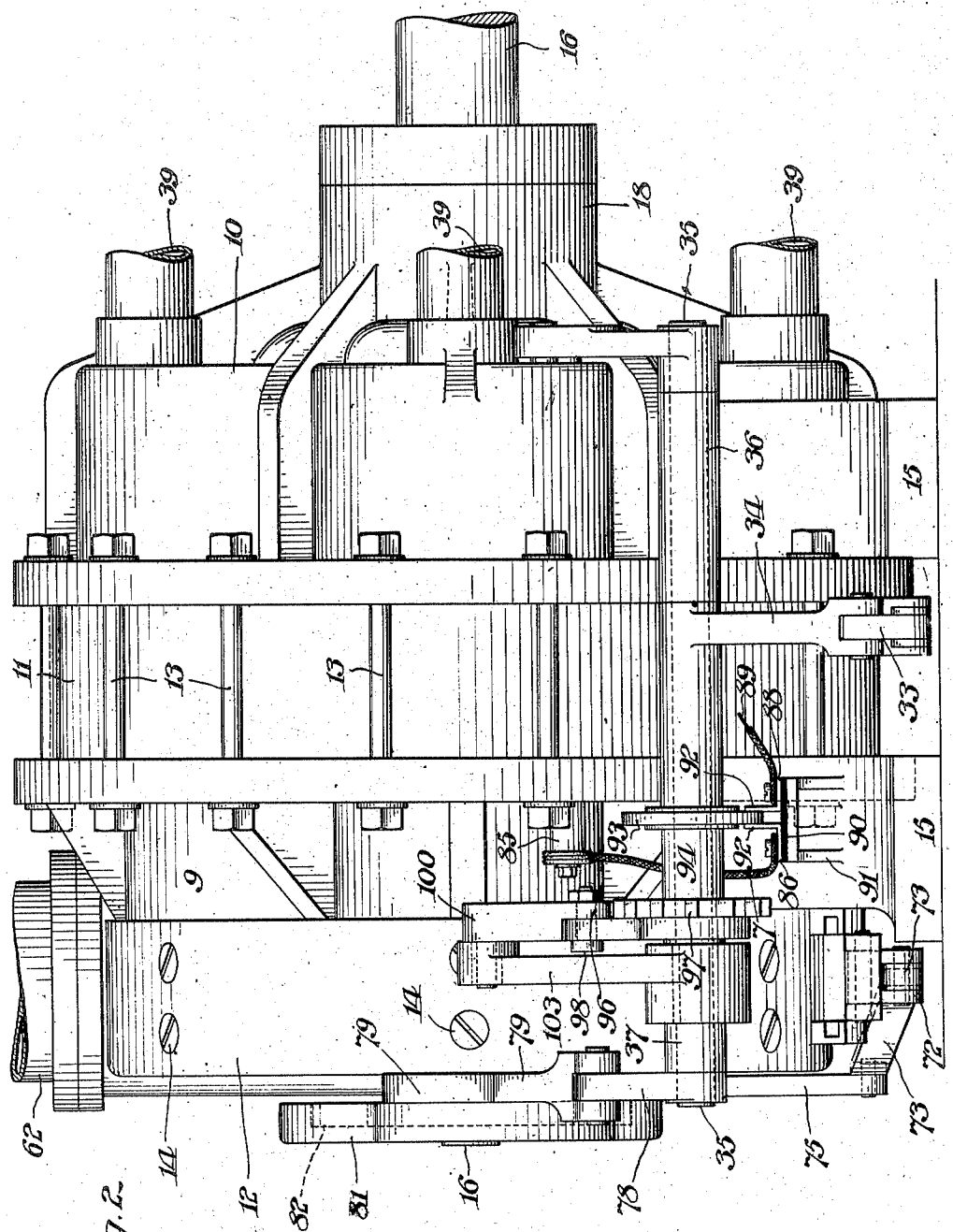
Fig. 2 is a side view thereof.

Referring to the drawings, the frame or casing of the engine comprises two outside or end members 9 and 10, an intermediate member 11 and a ring or head 12 surrounding the outer end of the end member 9. The three casing members 9, 10 and 11 are secured together by a circular series of spaced bolts 13, which extend through and between annular flanges on the members 9 and 10 and clamp the member 11 between the same; and the ring or head 12 is secured to the member 9 by screws 14. The casing is supported by suitable feet 15 which are formed on the end members 9 and 10.

The main or power shaft 16 of the engine extends entirely through the central portions of the casing members and is adapted to rotate in bearings 17 and 18 formed in the members 9 and 10, respectively, and provided with bushings 19 of bronze or other suitable material to permit the shaft 16 to be rotated at a high rate of speed.

The combustion chamber 20 is formed in the intermediate casing member 11, and surrounds the power shaft 16, and is provided with a circular series of discharge openings 21 which are controlled by a valve 22 and which are directed toward two impulse members 23 and 24 which are located in a space or chamber formed between the two casing members 10 and 11. The inner member 23 is in the form of a wheel and it is mounted on and keyed to the power shaft 16; and the outer member 24 is annular in form and surrounds the member 23 and is secured to the casing member 10. The adjacent faces of the members 23 and 24 are arranged in close proximity to each other and the member 23 is adapted to rotate within the member 24. The outer portion of the inner impulse member 23 and the inner portion of the outer impulse member 24 are provided with ribs 25 and 26 between which are formed impulse pockets or chambers 27 and 28, respectively, which are adapted to communicate with the combustion chamber 20 through the valve 22 and discharge openings 21.

The valve 22 is annular in form and is located within a cavity in the casing member 11, and it is adapted to be turned back and forth about the shaft 16 and to be moved toward and from the combustion chamber 20; and the valve 22 is provided with a circular series of ports 29 which extend therethrough and correspond in number with the discharge openings 21 of the combustion chamber 20. The valve ports 29 are adapted to register with the discharge openings 21 when the valve 22 is turned to one position, to afford communication between the combustion chamber 20 and the impulse pockets 27 and 28. When the valve 22 is turned back to another position, the body of the valve 22 between the ports 29 thereof are brought into registry with the discharge openings 21 and close the combustion chamber 20.

The side of the valve 22 away from the combustion chamber 20 is provided with projecting teeth 30 adapted to register with the spaces between projecting teeth 31 formed on the adjacent side of the fixed impulse member 24. The teeth 30 and 31 have coöperating beveled faces which, when the valve 22 is turned to close the discharge openings 21, force the body of the valve 22 up against the wall of the casing member 11 and form a tight joint between the valve 22 and member 11, closing the combustion chamber 20.

The valve 22 is provided with an arm 32 which extends outwardly through an opening in the casing member 11 and is pivotally connected to one end of a link 33. The other end of the link 33 is pivotally connected to an arm 34 which projects fixedly from a rock shaft 35 which is mounted to be rocked back and forth in bearings 36 and 37 on the casing members 10 and 12, respectively, whereby, when the shaft 35 is rocked back and forth, the valve 22 will be operated to open and close communication between the combustion chamber 20 and the impulse pockets 27 and 28, as previously explained. The link 33 is made of suitable spring metal and the body thereof has a sinuously formed portion 38 permitting the link 33 to yield and thereby force the valve 22 against the wall of the combustion chamber 20 for a tight joint when the shaft 35 is rocked to close the discharge openings 21.

The ribs 25 of the inner impulse member 23, between which the pockets 27 are formed, are arranged in an endless series around the exterior of the member 23, and are curved and inclined to follow spiral-like lines extending around the power shaft 16; and the ribs 26 of the outer impulse member 24, between which the pockets 28 are formed, are arranged in an endless series around the interior of the member 24, and are curved and inclined to follow spiral-like lines extending around the power shaft 16 in a reverse direction to the spiral-like lines followed by the ribs 26; so that the ribs 25 will cross the ribs 26, as clearly shown in Fig. 7.

Figure 3:
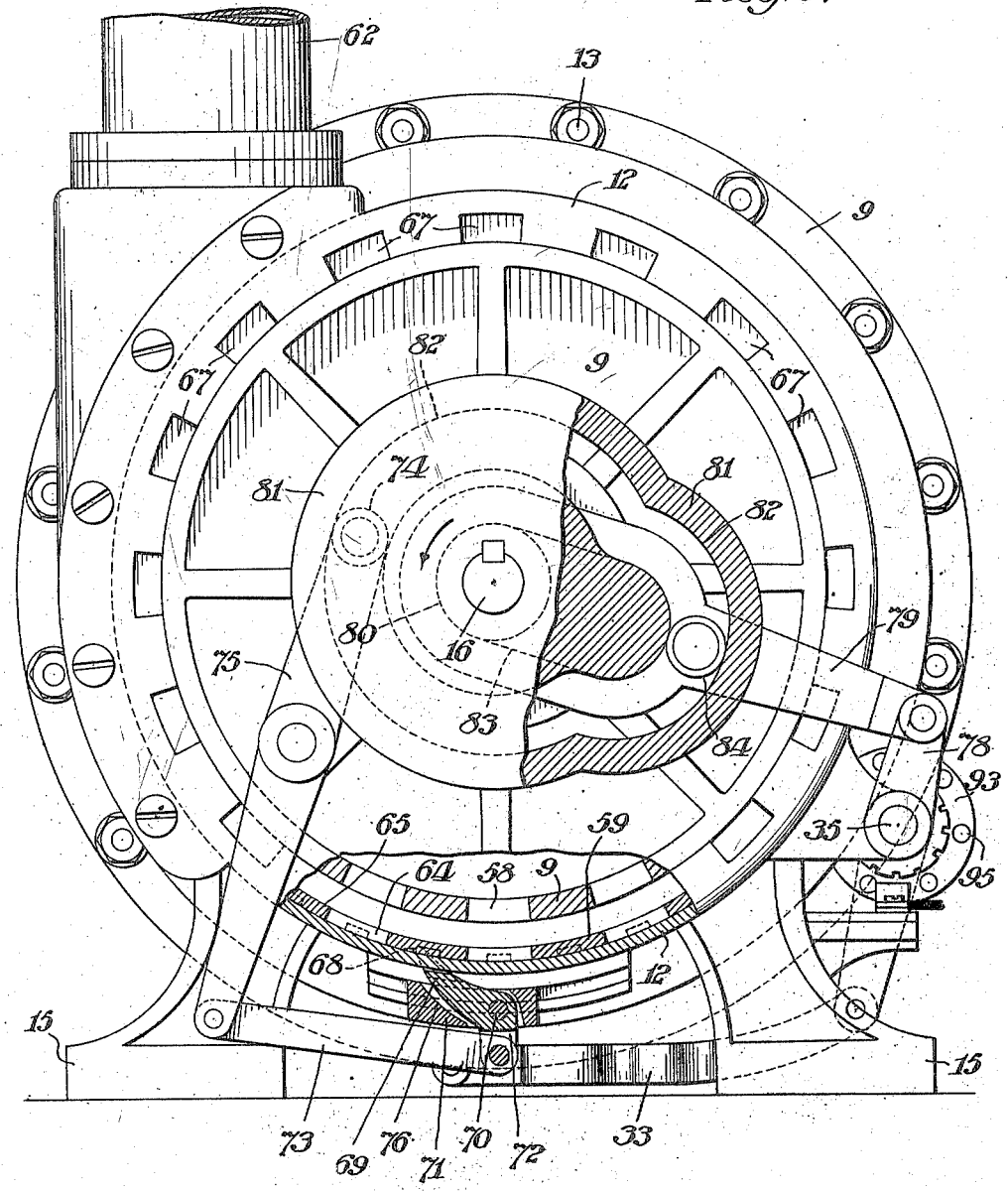
Fig. 3 is a view of the intake end of the engine, partly in section.

The openings 21 leading from the combustion chamber 20 and the valve ports 29 are inclined generally, to form, in effect, continuations of the impulse pockets 28, and to be directed against the sides of the ribs 25; whereby, when the valve ports 29 are in registry with the combustion chamber openings 21, and an explosive charge is fired within the combustion chamber 20, the expanding gases or products of combustion will pass through the openings 21 and ports 29 and into the impulse pockets 27 and 28, and act against the ribs 25 and 26 of the impulse members 23 and 24 in a manner to rotate the member 23 and therewith the power shaft 16 in the direction of the arrows shown in Figs. 3 and 4.

After the gases forming the products of combustion act upon the impulse members 23 and 24 the gases pass from the pockets 27 and 28 through exhaust openings 39 formed in the casing member 10 and distributed around the same. These openings 39 are controlled by an annular exhaust valve 40 which is seated in a cavity in the casing member 10 between it and the impulse members 23 and 24. The exhaust valve 40 is adapted to be turned back and forth about the shaft 16, and it is provided with a series of ports 41 which extend therethrough and correspond in number with the exhaust openings 39 and which are adapted to afford communication between the impulse pockets 27 and 28 and the exhaust openings 39. The valve ports 41 are adapted to register with the exhaust openings 39, when the valve 40 is turned in one direction, to permit the combustion gases to be exhausted from the impulse pockets 27 and 28; and, when the valve 40 is turned back to another position, the body of the valve closes the exhaust openings 39, and prevents the escape of gases from the impulse pockets 27 and 28.

The exhaust valve 40 is provided with a pin 42 which projects outwardly through a slot 43 in the casing member 10 and into a slot 44 in an arm 45 which projects fixedly from the rock shaft 35, hereinbefore referred to, whereby, when the shaft 35 is rocked back and forth, the valve 40 will be operated to open and close communication between the exhaust openings 39 and the impulse pockets 27 and 28.

Formed in the casing members 9 and 11 and surrounding the shaft 16 and its bearing 17 is a cylinder 46 within which is located a piston 47 which is adapted to be reciprocated longitudinally of the shaft 16. The piston 47 surrounds and is fitted to the shaft bearing 17 and it is provided with a sleeve 48 which projects from one side thereof and is fitted to slide over the bearing 17 and between the inner cylindrical portion of the intermediate casing member 11 and a cam sleeve 49 which surrounds and is keyed on the power shaft 16. The piston sleeve 48 is provided with a projection 50 which extends into an endless cam groove 51 formed in the cam sleeve and extending around the same. The contour of the cam groove 51 is such that during the rotation of the cam sleeve 48 by the impulse member 23 and power shaft 16, the walls of the groove 51 will act against the projection 50 and reciprocate the piston 47 from end to end of its cylinder 46, and move the piston 47 from the inner to the outer end of the cylinder 46, and back again, during each revolution of the power shaft 16. The cam sleeve 49 is held in place on the shaft 16 by and between the impulse member 23 and a collar 52 screwed on to the shaft 16; and the piston sleeve 48 is prevented from turning by a key 47ª.

The inner face of the piston 47 is provided with radially-extending, shallow grooves 47ª to permit the compressed gases to pass readily from the inner end of the cylinder 46 and through the openings 39 to the combustion chamber 20 as the piston approaches near to the wall of the casing member 11 forming the inner end of the cylinder 46, to prevent knocking.

The piston 47 has a circular series of openings 53 extending therethrough controlled by an annular valve 54 adapted to seat in an annular groove formed in the inner face of the piston. This valve 54 is provided with pins 55 which project through openings in the piston 47, and which are slidable therein, and which are adapted to support and guide the valve 54 toward and from its seat. The free ends of the pins 55 are provided with heads 56 which work in the enlarged ends of the openings through which the pins 55 extend and which are adapted to limit the movement of the valve 54 in a direction away from its seat. The valve 54 is adapted to be opened and closed by pressure on the respective sides of the piston 47, as will be hereinafter explained.

The casing member 11 is provided with a circular series of openings 57 which afford communication between the inner end of the cylinder 46 and the combustion chamber 20, and through which the explosive charge is forced from the cylinder 46 to the combustion chamber 20, when the piston 47 is moved from the position shown in Fig. 1 to the position shown in Fig. 9.

The casing member 9 is provided with a circular series of ports 58 which extend outwardly from the cylinder 46. The outer ends of these ports 58 are controlled by an annular valve 65 which is fitted to and adapted to be intermittently rotated in an annular seat formed between the casing members 9 and 12. This valve 65 is L-70 shaped in cross section and comprises connected walls 59 and 60, as clearly shown in the drawings. Adjacent to the valve 65 is a gas supply chamber 61 which is formed in one side of the casing member 12 and has a pipe 62 connected thereto which is adapted to be connected to and lead from a carbureter of any suitable type, for the supply of the explosive gas to the engine. The inner wall of the chamber 61 is provided with a circular series of openings 63 with which a corresponding series of openings 64 in the valve wall 59 is adapted to register, when the valve 58 is turned to afford communication between the gas supply chamber 61 and the cylinder 46 through the openings 63 and 64 and the ports 58, when the parts are in the position shown in Fig. 6. When the valve 65 is turned to another position, the wall 59 thereof between its openings 64 closes the openings 63. The valve wall 60 is provided with a circular series of openings 66 which are adapted to register with a corresponding series of exhaust openings 67 in the casing member 9 when the valve 65 is turned to close the openings 63, to permit air or gas to be exhausted from the cylinder 46 through the ports 58 and the openings 66 and 67.

The respective sides of the outer face of the wall 59 of the valve 65 is provided with alined teeth 68 which are adapted to be engaged by the bifurcated end of a pawl 69 which is pivoted, at 70, in a block 71, and which extends through a slot in the casing member 9 to the valve 65. The block 71 is fitted to slide in suitable ways which are formed in the casing member 9 and extend concentric with the valve 65. The pawl 69 is provided with a projecting arm 72 which is pivoted to one end of a link 73. The other end of the link 73 is pivoted to the lower end of a lever 75 which is fulcrumed on the casing member 9 and is provided on its upper end with a roller 74 which extends into the groove 82 of a cam 81 hereinafter referred to, whereby the lever 75 is rocked back and forth. When the lever 75 is rocked to move its lower end inwardly, the pawl 69 will be thereby first moved on its pivot 70 to free it from engagement with the valve 65, and until it is stopped by engagement with a wall 76 of the block 71, whereupon the pawl 69 and block 71 will be moved as a unit by the lever 75, to bring the free end of the pawl into a position to engage the next tooth 68 on the valve 65. Now, when the lever 75 is rocked to move its lower end outwardly the pawl 69 will be first moved on its pivot 70 to engage its free end with the adjacent valve tooth 68, and, thereafter, the pawl 69 and block 76 will be moved as a unit to cause the pawl 69 to advance the valve 65 a distance equal to the distance between two teeth 68. There are twice as many ratchet teeth 68 as there are valve openings 64, and there are twice as many ratchet teeth 68 as there are valve openings 66; and the valve openings 64 and 66 are so related to each other and to the inlet and exhaust openings 63 and 67, respectively, and to the teeth 68 that, as the pawl 69 is moved back and forth to advance the valve 65, step by step, the inlet openings 63 will be opened and closed in alternate succession at the completion of successive movements of the valve 65, and that the exhaust openings 67 will be opened and closed in alternate succession, at the completion of successive movements of the valve 65; the inlet openings 63 being open when the exhaust openings 67 are closed, and the exhaust openings 67 being open when the inlet openings 63 are closed.

The rock shaft 35 is provided with a projecting arm 78 which is pivoted to the outer end of an arm 79. The inner end of the arm 79 is supported by the hub 80 of the cam 81 which is keyed on one end of the power shaft 16, and has the cam groove 82 formed in the inner face thereof. The inner end of the arm 79 has a slot 83 formed therein, and the cam hub 80 extends through the slot 83; and the arm 79 is provided with a roller 84 which extends into the cam groove 82 and which is adapted to be acted upon by the cam 81, to reciprocate the arm 79 longitudinally, and thereby rock the shaft 35, during the rotation of the power shaft 16. The contour of the cam groove 82 is such that the arm 79 is moved outwardly and inwardly to rock the shaft 35 back and forth during about one-fifth of each revolution of the power shaft 16, and to cause the shaft 35 to remain at rest during the remaining four-fifths of each revolution thereof.

Secured in an opening in the casing member 9, and extending into the combustion chamber 20, is a suitable spark plug 85, adapted to ignite or fire the explosive charges within the combustion chamber 20. One terminal of the spark plug is connected to a contact plate 86 by a wire 87; and the other terminal of the spark plug 85 is connected to a contact plate 88 by a wire 89 and the casing member 9 receiving the plug 85, the wire 89 being interrupted by a suitable source of electric current for the production of a firing spark, at the terminals of the spark plug 85, when the contact plates 86 and 88 are electrically connected by the means which I shall now describe. The contact plates 86 and 88 mounted on an insulating plate 90 which is secured on a bracket 91 formed on the casing member 9; and the plates 86 and 88 are provided with spring tongues 92 which engage the respective sides of a wheel 93. The wheel 93 is formed of insulating material and is secured on a hub or collar 94 which is mounted to turn freely on the rock shaft 35; and the wheel 93 is provided with contact pins 95 which extend therethrough and are adapted to contact with the tongues 92 and electrically connect the contact plates 86 and 88 each time a pin 95 is brought into registry with the tongues 92, when the wheel 93 is rotated. The wheel 93 is intermittently rotated on the shaft 35 by a pawl 96 which is engaged with a ratchet wheel 97 on the collar 94. The pawl 96 is pivoted, at 98, on an arm 99 which projects from a collar which is loosely mounted on the rock shaft 35. The pawl 96 is provided with an outwardly projecting arm 100, having a pin 101 which extends into a slot 102 in an arm 103 which projects fixedly from the shaft 35; whereby, when the shaft 35 is rocked, the pawl 96 will be engaged with and disengaged from the ratchet wheel 97 and the ratchet wheel 97 and therewith the contact wheel 93 will be intermittently rotated. The teeth of the ratchet wheel 97 are so spaced relatively to the contact pins 95 that, during each alternate movement of the wheel 97, by the action of the pawl 96, a contact pin 95 is brought into registry with the contact plates 86 and 88, to produce a spark at the terminals of the spark plug 85, for the ignition or firing of an explosive charge within the combustion chamber 20.

The operation of the engine, briefly described, is as follows:

The impulse member 23 is rotated in the direction of the arrows in Figs. 3 and 4 by the expanding forces of the gases or products of combustion from the combustion chamber 20, as previously explained, and the power shaft 16, and cam sleeve 49 and cam 81 are thereby rotated in the same direction.

As the power shaft 16 is thus rotated, the cam 81 operates the arms 79 and 78 to rock the shaft 35 back and forth during one-fifth of each revolution of the power shaft, and the cam sleeve 49 operates to reciprocate the piston 47 within the cylinder 46, the piston 47 moving from one end of the cylinder to the other end thereof and back again during each revolution of the power shaft 16.

During each alternate forward and back motion of the piston 47, a charge of the explosive mixture is drawn from the carbureter pipe 62 into the cylinder 46 and subsequently passed into the combustion chamber 20 and through the pockets in the impulse members 23 and 24; and, during each intermediate alternate forward and back motion of the piston 47, a charge of atmospheric air is drawn into the cylinder and subsequently passed into the combustion chamber 20 and through the pockets of the impulse members 23 and 24, the alternate charges of atmospheric air serving to cool the parts of the engine to avoid over heating.

When the charge of the explosive mixture is drawn into the cylinder 46, the valve 65 is in the position shown in the drawings, the openings 67 are closed by the wall 60 of the valve 65, and the openings 64 of the valve 65 are in registry with the openings 63 of the gas supply chamber 61, and the piston 47 moves from the position shown in Fig. 9 to the position shown in Fig. 1, drawing the explosive mixture from the pipe 62 and into the cylinder 46 through the openings or ports 63, 64 and 58.

Just as the piston 47 starts back to the position shown in Fig. 1, the cam 81 operates the rock shaft 35 to move the valve 22 to close the openings 21 in the combustion chamber 20; and, as the piston 47 proceeds back to the position shown in Fig. 9, it tends to create a vacuum in the combustion chamber 20, which tendency moves the valve 54 with relation to the piston 47 to the position shown in Fig. 10 and draws the explosive mixture within the cylinder 46 through the piston openings 53 and into the inner end of the cylinder 46 and into the combustion chamber 20.

After the charge of explosive mixture thus passes to the inner side of the piston 47, and at or before the time that the piston 47 reaches its outermost position, shown in Fig. 10, the cam 81 operates the lever 75 to cause the pawl 69 to move the valve 65 to close the openings 63 leading from the carbureter, and to open the openings 67 leading from the atmospheric air, so that, when the piston 47 is now again moved from the position shown in Fig. 9 to the position shown in Fig. 1, the openings 63 will be closed and a charge of atmospheric air will be drawn into the outer end of the cylinder 46 through the ports or openings 67 and 58, while the explosive mixture within the inner end of the cylinder 46 is forced into the combustion chamber 20 through the openings 57 and compressed therein.

Just as the piston 47 reaches the position shown in Fig. 1, after compressing the explosive charge, the cam 81 operates the rock shaft 35 to move the valve 22 to open the openings 21; and, immediately the valve 22 starts to thus open communication between the combustion chamber 20 and the impulse pockets 27 and 28, the rock shaft 35 operates the arm to cause the pawl 69 to advance the wheel 93 and bring one of the contact pins 95 into contact with the tongues 92 of the contact plates 86 and 88, thereby completing the electric circuit for the spark plug 85 and firing the compressed explosive charge within the combustion chamber 20. The valve 22 quickly opens to its full extent, after the firing of the charge, and the resulting products of combustion or expanding gases, expand into the impulse pockets 27 and 28 and cause the rotation of the impulse member 23 and the power shaft 16, as previously explained. As the gases continue to expand within the pockets 27 and 28, the gases pass out through the exhaust openings 39 which are opened by the valve 40, under the influence of the rock shaft 35, immediately after the valve 22 is opened.

As the impulse member 23 and power shaft 16 are thus rotated, the piston 47 is again moved back to the position shown in Fig. 9; and, as the piston 47 starts back, the valve 22 is again closed, as previously explained. During this movement of the piston 47, to the outer end of the cylinder 46, the charge of atmospheric air, previously drawn into the cylinder 46, is caused to pass to the inner side of the piston 47 and into the combustion chamber 20, the same as the explosive charge was caused to thus pass, as previously explained. When the piston 47 now reaches the position shown in Fig. 9, it is again in position to be moved inwardly to draw another charge of the explosive mixture into the cylinder 46 from the carbureter pipe 62; and, as the next explosive charge is drawn into the cylinder 46, the previous charge of atmospheric air is compressed within the combustion chamber 20 and passed out through the impulse pockets 27 and 28 in the same manner that the previous charge of the explosive mixture was disposed of, as previously described. It will thus be seen that explosive charges and cooling or non-explosive charges are passed through the engine in alternate succession, and that the power generated by the firing of the explosive charges is transmitted to the power shaft 16 through the rotating impulse member 23.

I claim:

1. In an internal combustion engine, the combination of the frame thereof having a combustion chamber therein, a rotary impulse member adapted to be actuated by expanding gases from within the combustion chamber, a valve controlling the passage of gases from the combustion chamber to the impulse member, means for operating said valve, a valve controlling the passage of gases from the impulse member, means for operating the last named valve, means to introduce an explosive charge to said chamber, and means to ignite said charge.

2. In an internal combustion engine, the combination of the frame thereof having a combustion chamber therein, a rotary impulse member having projecting impulse blades, a fixed impulse member surrounding the rotary member and having impulse blades projecting toward the blades of the rotary member, said blades being adapted to be acted upon by expanding gases from within the combustion chamber to cause the rotation of the rotary member, a valve for controlling the passage of gases from the combustion chamber to said blades, means for operating said valve, a valve controlling the passage of gases from said blades, means for operating the last named valve, means to introduce an explosive charge to said chamber, and means to ignite said charge.

3. In an internal combustion engine, the combination of the frame thereof having a combustion chamber therein, a rotary impulse member having projecting impulse blades following spiral-like lines extending around the axis of rotation of the impulse member, a fixed impulse member surrounding the rotary member and having impulse blades projecting toward the blades of the rotary member and following spiral-like lines extending around the axis of rotation of the rotary member reversely of the first named lines, said blades being adapted to be acted upon by expanding gases from within the combustion chamber to cause the rotation of the rotary member, a valve for controlling the passage of gases from the combustion chamber to said blades, means for operating said valve, a valve controlling the passage of gases from said blades, means for operating the last named valve, means to introduce an explosive charge to said chamber, and means to ignite said charge.

4. In an internal combustion engine, the combination of the frame thereof in which a cylinder and a combustion chamber are separately formed, said frame having passages affording communication between said cylinder and chamber, a rotary impulse member adapted to be actuated by expanding gases from within the combustion chamber, a power shaft actuated by said member, a cam carried by said shaft, and means including a piston fitted to said cylinder and actuated by said cam to introduce an explosive charge to said chamber, and means to ignite said charge.

5. In an internal combustion engine, the combination of the frame thereof in which a cylinder and an annular combustion chamber are separately formed, a power shaft surrounded by said cylinder and chamber, a rotary impulse member carried by said shaft and adapted to be actuated by expanding gases from within the combustion chamber, means including a piston fitted to said cylinder to introduce an explosive charge to said chamber, and means to ignite said charge.

6. In an internal combustion engine, the combination of the frame thereof in which a cylinder and a combustion chamber are separately formed, said frame having passages affording communication between said cylinder and chamber, a power shaft surrounded by said cylinder and chamber, a rotary impulse member carried by said shaft and adapted to be actuated by expanding gases from within the combustion chamber, means including a piston fitted to said cylinder and surrounding said shaft and actuated by power therefrom to introduce an explosive charge to said chamber, and means to ignite said charge.

7. In an internal combustion engine, the combination of the frame thereof having an annular combustion chamber therein, a power shaft surrounded by said chamber, a rotary impulse member carried by said shaft and adapted to be actuated by expanding gases from within the combustion chamber, a cam carried by said shaft, means including a piston surrounding said shaft and actuated by said cam to introduce an explosive charge to said chamber, and means to ignite said charge.

8. In an internal combustion engine, the combination of the frame thereof having an annular combustion chamber therein, a power shaft surrounded by said chamber, a rotary impulse member carried by said shaft and adapted to be actuated by expanding gases from within the combustion chamber, an annular valve surrounding said shaft and controlling the passage of gases from the combustion chamber to the impulse member, means operated by said shaft for operating said valve, means to introduce an explosive charge to said chamber, and means to ignite said charge.

9. In an internal combustion engine, the combination of the frame thereof having an annular combustion chamber therein, a power shaft surrounded by said chamber, a rotary impulse member carried by said shaft and adapted to be actuated by expanding gases from within the combustion chamber, an annular valve surrounding said shaft and controlling the passage of gases from the combustion chamber to the impulse member, means operated by said shaft for operating said valve, an annular valve surrounding said shaft and controlling the passage of gases from the impulse member, and means operated by said shaft for operating the last named valve, means to introduce an explosive charge to said chamber, and means to ignite said charge.

10. In an internal combustion engine, the combination of the frame thereof in which a cylinder and a combustion chamber are separately formed, said frame having passages affording communication between said cylinder and chamber and communicating with each other, a power shaft surrounded by said cylinder and said chamber, a piston within said cylinder and actuated by power from said shaft to force an explosive charge from the cylinder to the combustion chamber, means for igniting said charge within the combustion chamber, and means operated by gases from the combustion chamber to rotate said shaft.

11. In an internal combustion engine, the combination of the frame thereof in which a cylinder and a combustion chamber is formed, said cylinder having gas inlet openings in one end thereof and gas outlet openings in the other end thereof communicating with the combustion chamber, a piston within the cylinder, a valve in said piston permitting gases to pass therethrough from said inlet openings to said outlet openings and preventing the passage of gases in the reverse direction, means for igniting an explosive charge within the combustion chamber, and means operated by gases from the combustion chamber for reciprocating said piston.

12. In an internal combustion engine, the combination of the frame thereof in which a cylinder and a combustion chamber is formed, said cylinder having gas inlet openings in one end thereof and gas outlet openings in the other end thereof communicating with the combustion chamber, a piston within the cylinder, a valve in said piston permitting gases to pass therethrough from said inlet openings to said outlet openings and preventing the passage of gases in the reverse direction, a power shaft, means for igniting an explosive charge within the combustion chamber, means operated by gases from the combustion chamber for rotating said shaft, and means operated by said shaft for reciprocating said piston.

13. In an internal combustion engine, the combination of the frame thereof in which a cylinder and a combustion chamber is formed, said cylinder having gas inlet openings in one end thereof and gas outlet openings in the other end thereof communicating with the combustion chamber, a piston within the cylinder, a valve in said piston permitting gases to pass therethrough from said inlet openings to said outlet openings and preventing the passage of gases in the reverse direction, a power shaft, means for igniting an explosive charge within the combustion chamber, means operated by gases from the combustion chamber for rotating said shaft, means operated by said shaft for reciprocating said piston, a valve for controlling said inlet openings, and means operated by said shaft for operating the last named valve.

14. In an internal combustion engine, the combination of the frame thereof having a combustion chamber therein, a rotary impulse member adapted to be actuated by expanding gases from within the combustion chamber, a power shaft and a supplemental shaft actuated by said member, means operated by the power shaft for introducing an explosive charge to said chamber, and a valve operated by the supplemental shaft for controlling the introduction of said charges to said chamber.

15. In an internal combustion engine, the combination of the frame thereof having a combustion chamber therein, a rotary impulse member adapted to be actuated by expanding gases from within the combustion chamber, a power shaft and a supplemental shaft actuated by said member, means operated by the power shaft for introducing an explosive charge to said chamber, a valve operated by the supplemental shaft for controlling the passage of gases from the combustion chamber to the impulse member, and means to ignite said charge.

16. In an internal combustion engine, the combination of the frame thereof having a combustion chamber therein, a rotary impulse member adapted to be actuated by expanding gases from within the combustion chamber, a power shaft and a supplemental shaft actuated by said member, means operated by the power shaft for introducing an explosive charge to said chamber, a valve operated by the supplemental shaft for controlling the passage of gases from the impulse member, and means to ignite said charge.

17. In an internal combustion engine, the combination of the frame thereof having a combustion chamber therein, a rotary impulse member adapted to be actuated by expanding gases from within the combustion chamber, a power shaft and a supplemental shaft actuated by said member, means operated by the power shaft for introducing an explosive charge to said chamber, a valve operated by the supplemental shaft for controlling the passage of gases from the combustion chamber to the impulse member, a valve operated by the supplemental shaft for controlling the passage of gases from the impulse member, and means to ignite said charge.

18. In an internal combustion engine, the combination of the frame thereof having a combustion chamber therein, a rotary impulse member adapted to be actuated by expanding gases from within the combustion chamber, a power shaft and a supplemental shaft actuated by said member, means operated by the power shaft for introducing an explosive charge to said chamber, and means operated by the supplemental shaft to ignite said charge.

19. In an internal combustion engine, the combination of the frame thereof having a combustion chamber therein, a rotary impulse member adapted to be actuated by expanding gases from within the combustion chamber, a power shaft and a supplemental shaft actuated by said member, means operated by the power shaft for introducing an explosive charge to said chamber, a valve operated by the supplemental shaft for controlling the passage of gases from the combustion chamber to the impulse member, and means operated by the supplemental shaft to ignite said charge.

20. In an internal combustion engine, the combination of the frame thereof providing a cylinder and a combustion chamber, a power member actuated by gases from the combustion chamber, means including a piston in said cylinder for introducing explosive charges and atmospheric air to said chamber one after the other, and means for igniting the explosive charges within said chamber.

GEORGE P. MALLORY.